United States Patent
Duan et al.

(10) Patent No.: US 11,894,601 B2
(45) Date of Patent: Feb. 6, 2024

(54) MILLIMETER-WAVE RADAR PACKAGE MODULE

(71) Applicant: 38TH RESEARCH INSTITUTE, CHINA ELECTRONICS TECHNOLOGY GROUP CORPORATION, Anhui (CN)

(72) Inventors: Zongming Duan, Anhui (CN); Chuanming Zhu, Anhui (CN); Ying Liu, Anhui (CN); Bowen Wu, Anhui (CN); Weiwei Jin, Anhui (CN); Bingfei Dou, Anhui (CN); Yuefei Dai, Anhui (CN)

(73) Assignee: 8TH RESEARCH INSTITUTE, CHINA ELECTRONICS TECHNOLOGY GROUP CORPORATION, Hefei (CN)

( * ) Notice: Subject to any disclaimer, the term of this patent is extended or adjusted under 35 U.S.C. 154(b) by 511 days.

(21) Appl. No.: 17/206,440

(22) Filed: Mar. 19, 2021

(65) Prior Publication Data

US 2022/0247066 A1 Aug. 4, 2022

(30) Foreign Application Priority Data

Jan. 29, 2021 (CN) .......................... 202110127024.3

(51) Int. Cl.
*H01Q 1/22* (2006.01)
*G01S 7/03* (2006.01)
*H01Q 21/00* (2006.01)
*G01S 7/02* (2006.01)

(52) U.S. Cl.
CPC ........... *H01Q 1/2283* (2013.01); *G01S 7/032* (2013.01); *H01Q 21/0025* (2013.01); *H01Q 21/0087* (2013.01); *G01S 7/028* (2021.05)

(58) Field of Classification Search
CPC ............. H01Q 1/2283; H01Q 21/0025; H01Q 21/0087; G01S 7/032; G01S 7/028
USPC .......................................................... 342/175
See application file for complete search history.

(56) References Cited

U.S. PATENT DOCUMENTS

| | | | | |
|---|---|---|---|---|
| 6,249,242 | B1 * | 6/2001 | Sekine | H01L 23/66 |
| | | | | 342/175 |
| 6,424,313 | B1 * | 7/2002 | Navarro | H01Q 21/0093 |
| | | | | 343/770 |
| 10,103,447 | B2 * | 10/2018 | Tong | H01L 31/0203 |
| 10,181,657 | B2 * | 1/2019 | Ai | H01Q 21/061 |
| 10,317,512 | B2 * | 6/2019 | Trotta | G01S 13/584 |
| 10,408,919 | B2 * | 9/2019 | Trotta | G01S 13/343 |
| 10,725,150 | B2 * | 7/2020 | Trotta | G01S 7/354 |
| 10,867,934 | B2 * | 12/2020 | Maruthamuthu | H01L 21/4857 |

(Continued)

FOREIGN PATENT DOCUMENTS

| | | | | |
|---|---|---|---|---|
| CN | 110098468 A * | 8/2019 | ........... | H01Q 1/3233 |
| CN | 110456313 A * | 11/2019 | ............. | H01Q 1/525 |

(Continued)

*Primary Examiner* — Nuzhat Pervin

(57) ABSTRACT

Provided is a millimeter-wave radar package module, which relates to antenna packaging. The millimeter wave radar package module includes a package and a plurality of antenna units packaged therein. The package includes a chip, and the chip includes a transmitter and a receiver. The antenna units are respectively connected to an output pin of the receiver and an output pin of the transmitter through a transmission line.

7 Claims, 2 Drawing Sheets

(56) References Cited

U.S. PATENT DOCUMENTS

| | | | |
|---|---|---|---|
| 10,992,059 B2* | 4/2021 | Zhu | H01Q 21/0006 |
| 2004/0150554 A1* | 8/2004 | Stenger | H01Q 3/26 |
| | | | 342/175 |
| 2005/0003768 A1* | 1/2005 | Laroia | H04B 7/0626 |
| | | | 455/101 |
| 2016/0178730 A1* | 6/2016 | Trotta | G01S 13/931 |
| | | | 342/175 |
| 2016/0306034 A1* | 10/2016 | Trotta | G01S 13/343 |
| 2018/0074173 A1* | 3/2018 | Trotta | G01S 7/003 |
| 2018/0351262 A1* | 12/2018 | Yoon | H01Q 21/065 |
| 2019/0113601 A1* | 4/2019 | Trotta | G01S 13/931 |
| 2019/0288382 A1* | 9/2019 | Kamgaing | H01Q 21/22 |
| 2019/0326232 A1* | 10/2019 | Lin | H01Q 1/2283 |
| 2020/0052376 A1* | 2/2020 | Zhu | H01Q 3/38 |
| 2020/0259267 A1* | 8/2020 | Park | H01Q 9/0414 |
| 2020/0313305 A1* | 10/2020 | Yang | H01Q 21/065 |
| 2020/0348393 A1* | 11/2020 | Trotta | G01S 7/003 |
| 2021/0288398 A1* | 9/2021 | Sato | G01S 7/4026 |
| 2021/0305694 A1* | 9/2021 | Kim | H01Q 9/0407 |
| 2022/0173495 A1* | 6/2022 | Huang | H01Q 19/17 |
| 2022/0247083 A1* | 8/2022 | Kim | H01Q 21/0075 |
| 2023/0035608 A1* | 2/2023 | Dalmia | H01Q 21/065 |
| 2023/0044018 A1* | 2/2023 | Zhu | G01S 13/32 |
| 2023/0299488 A1* | 9/2023 | Carceller | H01P 1/2088 |
| | | | 343/904 |

FOREIGN PATENT DOCUMENTS

| | | | | |
|---|---|---|---|---|
| CN | 210805998 U | | 6/2020 | |
| DE | 112012000285 T5 * | | 9/2013 | H01Q 1/2283 |
| TW | I661756 B | | 6/2019 | |

* cited by examiner

MILLIMETER-WAVE RADAR PACKAGE MODULE

CROSS-REFERENCE TO RELATED APPLICATIONS

This application claims the benefit of priority from Chinese Patent Application No. 202110127024.3, filed on Jan. 29, 2021. The content of the aforementioned application, including any intervening amendments thereto, is incorporated herein by reference in its entirety.

TECHNICAL FIELD

This application relates to antenna packaging technology, and more particularly to a millimeter-wave radar package module.

BACKGROUND

The working wavelength of the antenna under the millimeter-wave frequency has reached the millimeter level, which makes it possible to integrate the millimeter-wave chip with the antenna. Through the antenna-in-package technology, the antenna can be integrated in the package of the chip, which not only renders the chip compatible with the antenna in size, but also reduces the cost, thereby providing an excellent antenna integration solution for the radar package module.

Currently, the radar package modules are often manufactured by single chip packaging, and the transmitting and receiving channels of the chip are both connected to a dipole antenna.

Unfortunately, the existing single-chip packaging technique has the problem that the wide beam cannot identify multiple objects with a certain angle. Moreover, the number of packaged antennas is too limited to effectively form an antenna array, failing to improve the resolution of the system.

SUMMARY

An object of this application is to provide a millimeter-wave radar package module to solve the problem that the existing radar package modules made by the single chip packaging have deficiencies in the performance.

The technical solutions of this application are described as follows.

This application provides a millimeter-wave radar package module, comprising:
a package; and
a plurality of antenna units;
wherein the package comprises a chip, and the chip comprises a transmitter and a receiver; the plurality of antenna units are respectively connected to an output pin of the receiver and an output pin of the transmitter through a transmission line.

In some embodiments, each of the plurality of antenna units is selected from the group consisting of a planar patch antenna, a planar dipole antenna, an end-fire antenna, a Vivaladi antenna and a combination thereof.

In some embodiments, the plurality of antenna units are divided into receiving antennas and transmitting antennas;
wherein a distance between two adjacent receiving antennas is half an antenna working wavelength; and a distance between two adjacent transmitting antennas is a product of the number of the receiving antennas and half the antenna working wavelength.

In some embodiments, the output pin of the receiver is connected to the receiving antennas, and the output pin of the transmitter is connected to the transmitting antennas.

In some embodiments, the transmission line comprises a feeder line and a transmission transition structure; the plurality of antenna units are connected to the transmission transition structure through the feeder line, and the transmission transition structure is connected to a pin of the chip.

In some embodiments, the feeder line connected to individual transmitting antennas is the same in length, and the feeder line connected to individual receiving antennas is the same in length.

In some embodiments, the plurality of antenna units, the transmission transition structure and the feeder line are manufactured based on a three-dimensional substrate packaging technique or a fan-out wafer-level packaging technique.

In some embodiments, when there are a plurality of chips provided in the package, the plurality of chips are connected by the transmission line.

Compared to the prior art, this application has the following beneficial effects. In this application, a plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

BRIEF DESCRIPTION OF THE DRAWINGS

The disclosure will be described below in detail with reference to the embodiments and accompanying drawings to make the technical solutions of the disclosure clearer. Obviously, presented in the drawings are only some embodiments of the disclosure. Other embodiments made by those of ordinary skill in the art based on the content disclosed herein without sparing any creative effort should fall within the scope of the disclosure.

DETAILED DESCRIPTION OF EMBODIMENTS

Figure 1:
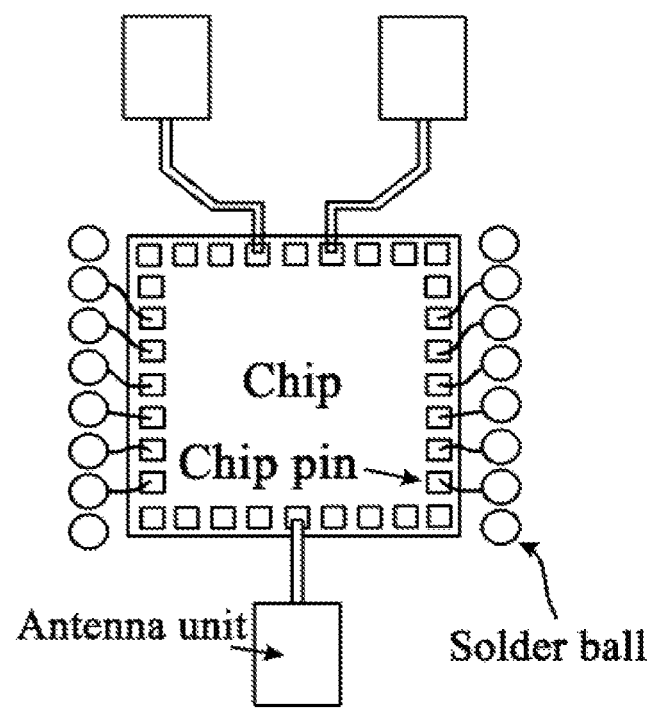
FIG. 1 is a schematic diagram of a millimeter-wave radar package module according to Embodiment 1 of the present disclosure.

The object, technical solutions and advantages of this application will be described below clearly and completely with reference to the embodiments. Obviously, these embodiments are merely some embodiments of this application, and are not intended to limit the scope of this application. Any changes, modifications and improvements made by those skilled in the art without departing from the spirit of the present disclosure shall fall within the scope of the present disclosure.

This application provides a millimeter-wave radar package module to solve the problem of insufficient performance in the single chip package method for the manufacturing of existing radar package modules.

The technical solutions of the embodiments are specifically described below.

A plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

The disclosure will be described in detail below with reference to accompanying drawings and embodiments to facilitate the understanding of the above technical solutions.

This application provides a millimeter-wave radar package module, including: a package and a plurality of antenna units. The package includes a chip, and the chip includes a transmitter and a receiver. The plurality of antenna units are respectively connected to an output pin of the receiver and an output pin of the transmitter through a transmission line.

This application has the following beneficial effects.

In this application, a plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

In some embodiments, each of the plurality of antenna units is selected from the group consisting of a planar patch antenna, a planar dipole antenna, an end-fire antenna, a Vivaladi antenna and a combination thereof.

In some embodiments, the plurality of antenna units are divided into receiving antennas and transmitting antennas.

A distance between two adjacent receiving antennas is half an antenna working wavelength; and A distance between two adjacent transmitting antennas is a product of a number of the receiving antennas and half an antenna working wavelength.

In some embodiments, the output pin of the receiver is connected to the receiving antennas, and the output pin of the transmitter is connected to the transmitting antennas.

In some embodiments, the transmission line includes a feeder line and a transmission transition structure; the plurality of antenna units are connected to the transmission transition structure through the feeder line, and the transmission transition structure is connected to a pin of the chip.

In some embodiments, the feeder line connected to individual transmitting antennas is the same in length, and the feeder line connected to individual receiving antennas is the same in length.

In some embodiments, the plurality of antenna units, the transmission transition structure and the feeder line are manufactured based on a three-dimensional substrate packaging technique or a fan-out wafer-level packaging technique.

In some embodiments, when there are a plurality of chips provided in the package, the plurality of chips are connected by the transmission line.

The millimeter-wave radar package module of the disclosure will be described in detail as follows.

Embodiment 1

Provided herein is a millimeter-wave radar package module, which includes a chip and a plurality of antenna units. The chip includes a transmitter and a plurality of receivers. The antenna units are divided into transmitting antennas and receiving antennas corresponding to the number of receivers, and the transmitting antennas and receiving antennas are both co-polarized antennas.

In order to realize the function of multiple input multiple output (MIMO), the set of the number of the receiving antennas needs to take the limitation of distance between the antenna units into account. Therefore, the distance between two adjacent receiving antennas is at least half working wavelength of the antenna. As shown in FIG. 1, the chip includes two receivers and two receiving antennas set correspondingly.

The antenna units are respectively connected to an output pin of the receiver and an output pin of the transmitter through a transmission line.

The transmission line includes a feeder line and a transmission transition structure. The antenna units are connected to the transmission transition structure through the feeder line, and the transmission transition structure is connected to a chip pin. The transmission transition structure is a ball grid array (BGA) or a via hole. The feeder lines respectively connected to the two receiving antennas are the same in length.

The manufacturing process for the antenna unit, the transmission transition structure and the feeder line is not limited herein. For example, they can be manufactured by a three-dimensional substrate packaging technique or a fan-out wafer-level packaging technique.

A plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

Embodiment 2

A millimeter-wave radar package module is provided herein, which includes a chip and a plurality of antenna units. The chip includes a plurality of transmitters and a plurality of receivers. The antenna units are divided into transmitting antennas corresponding to the transmitters in number and receiving antennas corresponding to the receivers in number, and the transmitting antennas and the receiving antennas are both co-polarized antennas.

Figure 2:
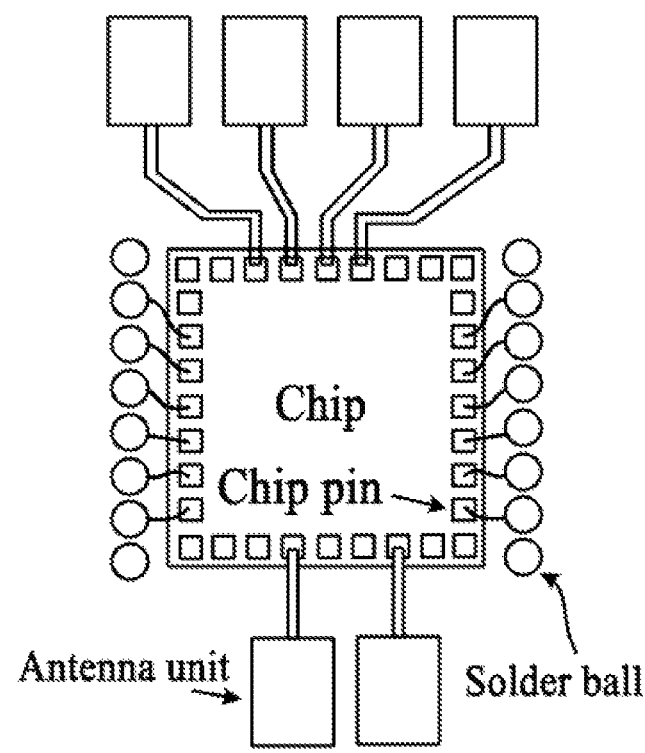
FIG. 2 is a schematic diagram of a millimeter-wave radar package module according to Embodiment 2 of the present disclosure.

In order to realize the function of MIMO, the set of the number of transmitting antennas and receiving antennas needs to take the limitation of distance between the antenna units into account. Therefore, the distance between two adjacent receiving antennas is at least half working wavelength of the antenna, and the distance between two adjacent transmitting antennas is at least a product of the number of the receiving antennas and half working wavelength of the antenna. As shown in FIG. 2, the chip includes two transmitters and four receivers, and correspondingly, four receiving antennas and two transmitting antennas are provided.

The antenna units are respectively connected to the output pin of the receiver and the output pin of the transmitter through a transmission line.

The transmission line includes a feeder line and a transmission transition structure. The antenna unit is connected to the transmission transition structure through the feeder line, and the transmission transition structure is connected to a chip pin. The feeder lines connected to the two transmitting antennas are the same in length, and the feeder lines connected to the four receiving antennas are the same in length. The transmission transition structure is a BGA or a via hole.

The manufacturing process of the antenna unit, the transmission transition structure and the feeder line is not limited herein. For example, they can be manufactured by a three-dimensional substrate packaging technique or a fan-out wafer-level packaging technique.

A plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

Embodiment 3

A millimeter-wave radar package module is provided herein, which includes two chips and a plurality of antenna units. Each chip includes a plurality of transmitters and a plurality of receivers. When there are a plurality of chips provided in the package, the plurality of chips are connected by the transmission line. The antenna units are divided into transmitting antennas corresponding to the transmitters in number and receiving antennas corresponding to the receivers in number.

Figure 3:
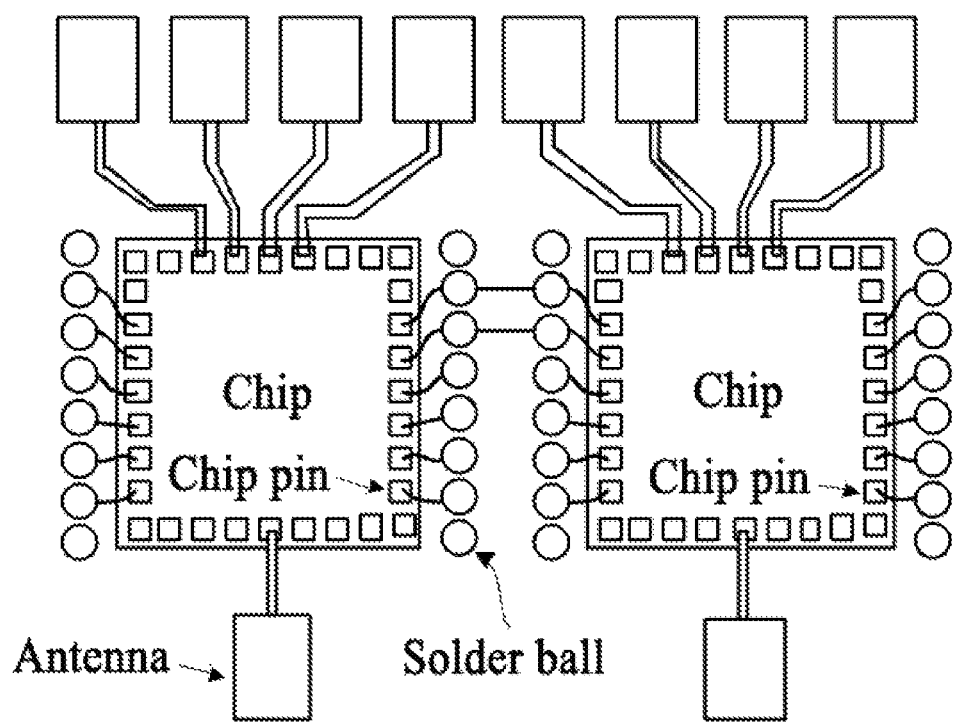
FIG. 3 is a schematic diagram of a millimeter-wave radar package module according to Embodiment 3 of the present disclosure.

In order to realize the function of MIMO, the set of the number of transmitting antennas and receiving antennas needs to take the limitation of distance between the antenna units into account. Therefore, the distance between two adjacent receiving antennas is at least half working wavelength of the antenna, and the distance between two adjacent transmitting antennas is at least a product of the number of the receiving antennas and half working wavelength of the antenna. As shown in FIG. 3, each chip includes one transmitter and four receivers, and correspondingly, two transmitting antennas and eight receiving antennas are provided.

The antenna units are respectively connected to the output pin of the receiver and the output pin of the transmitter through a transmission line.

The transmission line includes a feeder line and a transmission transition structure. The antenna unit is connected to the transmission transition structure through the feeder line, and the transmission transition structure is connected to a chip pin. The feeder lines connected to the two transmitting antennas are the same in length, and the feeder lines connected to the eight receiving antennas are the same in length. The transmission transition structure is a BGA or a via hole.

The manufacturing process of the antenna unit, the transmission transition structure and the feeder line is not limited herein. For example, they can be manufactured by a three-dimensional substrate packaging technique or a fan-out wafer-level packaging technique.

In the radar package module provided herein, multiple antenna units and a chip are integrated in one package, which reduces the size and cost of the radar module and improves the integration of the system, facilitating the installation of the module.

Compared to the prior art, this application has the following beneficial effects.

1. In this application, a plurality of antenna units are packaged in the package to form an antenna array. Compared to the existing single-channel antenna, the antenna array of this application achieves the improvement in the resolution of the radar system, which can greatly improve the resolution of the whole system and realize the beam scanning.

2. In the radar package module provided herein, multiple antenna units and a chip are integrated in one package, which reduces the size and cost of the radar module and improves the integration of the system, facilitating the installation of the module.

It should be noted that based on the above description, those of ordinary skill in the art can clearly understand that the above embodiments can be implemented by means of software plus some necessary versatile hardware platforms. In view of this, the above technical solution can be embodied essentially in the form of a software product or the part that contributes to the prior art can be embodied in the form of a software product. The computer software product can be stored in a storage media, such as read-only memory (ROM)/random-access memory (RAM), magnetic discs, and compact discs, etc., and includes several instructions to enable a computer device (such as a personal computer, a server and a network device) to execute the methods described in each embodiment or some parts of the embodiment. As used herein, the terms such as "first" and "second" are only used to distinguish one entity or operation from another entity or operation, and do not necessarily require or imply any actual relationship or order between these entities or operations. Moreover, the terms "include", "comprise" or any other variants thereof are intended to mean the non-exclusive inclusion, and thus a process, method, product or device n not only includes those specified elements, but also includes other elements that are not clearly listed, or those elements inherent to this process, method, product or device. Unless otherwise specified, the element limited by the phrase "including a . . . " does not indicate the exclusion of other identical elements in the process, method, product or device including the element.

The above embodiments are only illustrative of the present disclosure, and are not intended to limit the scope of the present disclosure. It should be understood that changes, modifications and improvements made by those skilled in the art without departing from the spirit of the present disclosure shall fall within the scope of the present disclosure.

What is claimed is:

1. A millimeter-wave radar package module, comprising:
a package; and
a plurality of antenna units;
wherein the package comprises a plurality of chips, and each of the plurality of chips comprises a transmitter and a receiver; and the plurality of antenna units are respectively connected to an output pin of the receiver and an output pin of the transmitter through a transmission line;
the plurality of antenna units are divided into receiving antennas and transmitting antennas;
a distance between two adjacent receiving antennas is a first half an antenna working wavelength; and
a distance between two adjacent transmitting antennas is a product of a number of the receiving antennas and a second half an antenna working wavelength.

2. The millimeter-wave radar package module of claim 1, wherein each of the plurality of antenna units is selected from the group consisting of a planar patch antenna, a planar dipole antenna, an end-fire antenna a Vivaladi antenna and a combination thereof.

3. The millimeter-wave radar package module of claim 1, wherein the output pin of the receiver is connected to the receiving antennas, and the output pin of the transmitter is connected to the transmitting antennas.

4. The millimeter-wave radar package module of claim 1, wherein the transmission line comprises a feeder line and a transmission transition structure; and the plurality of antenna units are connected to the transmission transition structure through the feeder line, and the transmission transition structure is connected to a pin of each of the plurality of chips.

5. The millimeter-wave radar package module of claim 4, wherein the feeder line connected to individual transmitting antennas is the same in length, and the feeder line connected to individual receiving antennas is the same in length.

6. The millimeter-wave radar package module of claim 1, wherein the plurality of antenna units, the transmission transition structure and the feeder line are manufactured based on a three-dimensional substrate packaging technique or a fan-out wafer-level packaging technique.

7. The millimeter wave radar package module of claim 1, wherein the plurality of chips are connected by the transmission line.

* * * * *